Feb. 21, 1967 — E. E. MUSSER — 3,305,230

SUPPLEMENTAL SPRING FOR VEHICLE SUSPENSION SYSTEM

Filed Jan. 15, 1965 — 2 Sheets-Sheet 1

INVENTOR
EDWIN E. MUSSER
BY *Charles W Hull*
ATTORNEY

INVENTOR
EDWIN E. MUSSER
BY *Charles W Hull*
ATTORNEY

3,305,230
SUPPLEMENTAL SPRING FOR VEHICLE SUSPENSION SYSTEM
Edwin E. Musser, Harrisburg, Pa., assignor to Stanley Spring Works, Inc., Harrisburg, Pa.
Filed Jan. 15, 1965, Ser. No. 425,700
10 Claims. (Cl. 267—41)

This invention relates to vehicle suspension assembly in which an auxiliary spring is employed in order to supplement and stabilize the entire suspension system. Additionally, the invention is directed to a spring unit itself and to a method for installing it in a vehicle.

The present invention is especially well adapted for employment in suspension systems used for supporting the rear end of an automobile body over the axle assembly. Modern automobiles usually employ a vertically oriented coil spring in this portion of their suspensions. While the coil spring system is satisfactory, it is subject to certain drawbacks which are remedied by the present invention. A first drawback is that when vehicles are driven along rough, bumpy surfaces the pounding of the road will cause "bottoming" as the vehicle body makes physical impact with the axle assembly. Furthermore, the bodies of vehicles having this type suspension may sway from side-to-side as the automobile is driven around a corner. Still another problem results when the trunk of the automobile is heavily loaded, lowering the rear end to produce the well-known "tail-dragging" problem.

Springs capable of preventing the above-described problems are known in the prior art. These prior art devices, as well as the present invention, are capable of satisfactorily achieving the object of avoiding "bottoming," swaying and "tail-dragging."

Unfortunately, the supplemental springs used in the prior art have a rather narrow range of applicability. Generally, they are specially constructed to fit only a particular size and make of car and they are not readily exchangeable. Also, when the springs lose their strength, they must be replaced since there is no provision for adjusting or preloading the tension in the springs. Furthermore, they are incapable of any type of adjustment which would render them suitable for use when an automobile is subjected to both high and low load conditions.

Accordingly, it is an object of the present invention to provide a supplemental spring which may be preloaded and adjusted in a manner so that a user may compensate both for varying load conditions of the vehicle and for loss of strength of the spring. This particular object is achieved by the manner in which one end of the spring is attached to the axle assembly; namely, by having adjustable clamping means encircling the axle housing to permit positioning of one end of the spring in an infinite number of preselected positions.

Another object is to provide a spring which may be easily installed and which is capable of being attached, without modification, to an unusually large number of current automobile models. Still another object is to have a supplemental spring which is simple in construction and operation and relatively inexpensive to manufacture and install.

A further object is to introduce a method in which a supplemental spring may be attached between an axle assembly and a vehicle body so that the spring is under stress when the vehicle is in its normal loaded condition.

The overall combination which produces the aforesaid advantageous results includes a suspension assembly in which an axle assembly includes an axle housing of circular cross section. The vehicle body, including the frame, is yieldably supported above the axle assembly, and a generally vertical coil spring is attached to and between the vehicle body and the axle assembly. The supplemental spring includes a leaf spring with one end attached to the vehicle body at a point spaced from the coil spring, and its opposite end attached to the axle housing. Clamping means are used for attaching the opposite end of the leaf spring to the axle housing. This clamping means encircles the axle housing, and there are means for adjusting its tightness on the axle housing.

The satisfaction of the above-described objects and the operation of the present invention will be more clearly understood by reference to the following specification and the drawings, wherein.

Figure 1:
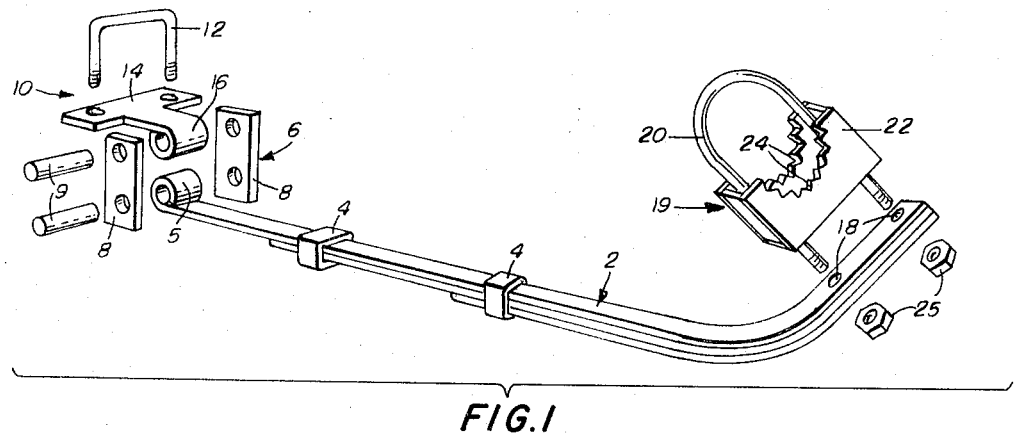
FIG. 1 is an exploded perspective view of the supplemental spring of this invention, including the hardware used for attaching it to a vehicle.

In FIG. 1, it will be seen that the supplemental spring itself is a narrow, elongated leaf spring 2 made of a plurality of leaves encircled by retaining bands 4 in a conventional manner. Each opposite end of the spring is relatively straight, and the point of maximum curvature is further from the left end of the spring, as illustrated, than from the right end. The straight portion at the left end extends for a major portion of the spring's length. This end is rolled at 5, so that it may be attached to the vehicle frame which, for descriptive purposes, will be considered to be a portion of the vehicle body. The means for attaching this left end of the spring to the frame includes a link 6, made of a pair of plates 8 and end-peened pivot pins 9; and a bracket assembly 10 which grips the vehicle frame. This bracket assembly includes a U-bolt 12 for encircling the frame and a plate 14 which has a rolled portion 16 for pivotally receiving the uppermost pivot pin 9. The precise manner of securing the bracket assembly 10 to the frame will be dealt with in detail below.

The right end of the spring 2, i.e. that end which attaches to the axle assembly, has a pair of spaced apertures 18 extending through all leaves of the spring. The clamping means 19 includes a U-bolt 20 with a circular bend and parallel legs extending through the apertures 18. Nuts 25 are used to adjust the tightness of the clamping means 19 on an axle housing. A bracket 22 has apertures (not shown) on its underside for slideably receiving the parallel legs of the U-bolt 20. A flat portion of this bracket 22 rests on the relatively straight portion of the spring, and circular or arcuate surfaces 24 are serrated to assist in gripping an axle housing in the manner described below.

Figure 2:
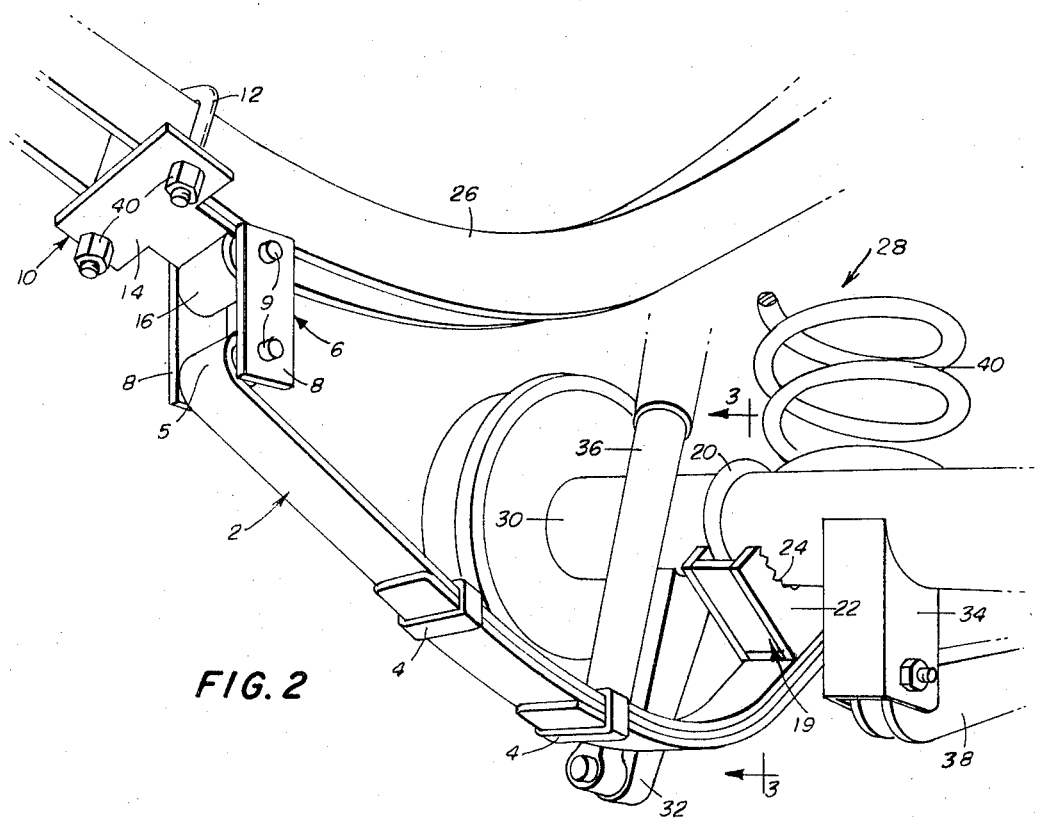
FIG. 2 is a perspective view of the supplemental spring located on the undercarriage of an automobile, with certain portions of the automobile suspension removed for purposes of illustration.

An installation of the supplemental spring of this invention is shown in FIG. 2. Here, the rear suspension of a modern automobile with coil spring suspension is illustrated. This includes the frame 26 of the vehicle body, and the axle assembly 28 which for present purposes is intended to include the axle housing 30 and the various adjuncts which are attached and proximate thereto. Dependent projections 32 and 34, attached to the axle housing, receive the shock absorber 36 and the torque or radius rod 38, respectively.

Figure 5:
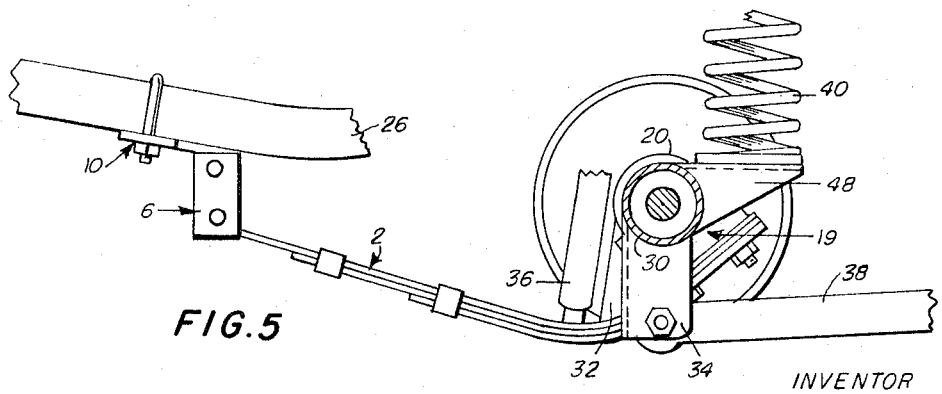
FIG. 5 is an elevational view, partially in section, taken along the lines 5—5 in FIG. 4.

The primary suspension spring 40 is a coil spring with a vertical axis, having its opposite ends attached to and between the vehicle body and the axle assembly 28. FIG. 5 shows one way in which the lowermost end of the spring may be supported on the axle assembly.

The supplemental spring 2 has its center of curvature thereabove when installed. One end is attached rearwardly of the axle to the frame 26 at a point spaced from the coil spring, by means of the frame bracket assembly 10. The U-bolt 12 is placed over the frame and then passes through the suitable apertures in plate 14. Nuts 40 are tightened to secure it in place. It is desirable to place a block of wood or other material between the flanges of the frame 26 before tightening the nuts 40, to prevent damage to the frame and to provide for a more secure connection.

An extremely important element of this invention is the clamping means 19 for securing the forward end of the spring to the axle assembly. The U-bolt 20 encircles the axle housing 30 of circular cross-section. Bracket 22 is disposed so that its serrated surface 24 is in contact with the axle housing. This permits rotation of the forward clamp about the axle housing when the nuts 25 are loosened, thus allowing for convenient adjustment of the spring.

Figure 3:
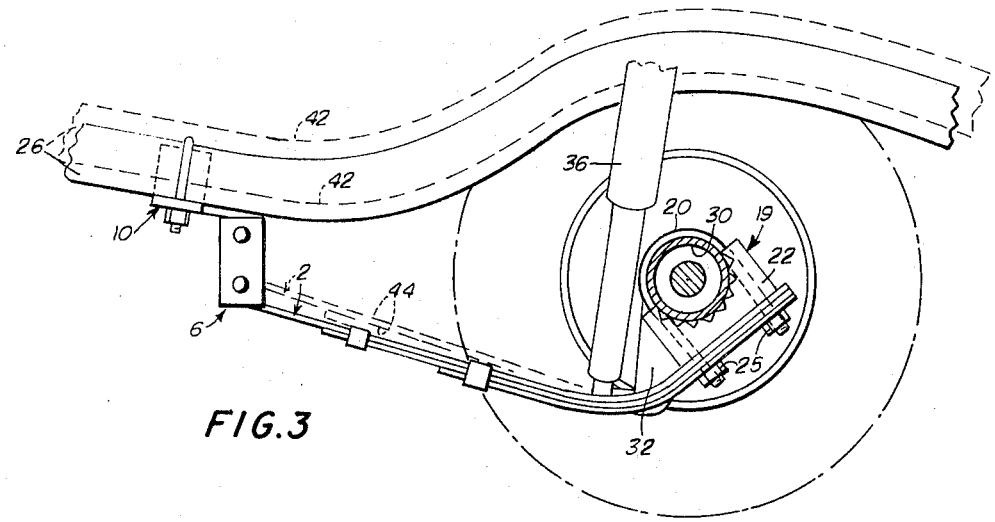
FIG. 3 is a sectional view taken along the line 3—3 of FIG. 2.

The significance of this adjustable feature will be appreciated more clearly when referring to FIG. 3. As the clamping means 19 is rotated in a clockwise direction, the upward force exerted by the rear end of the spring 2 will be increased, and the downward force on the primary suspension spring will consequently be reduced. The fact that the position of the U-bolt 20 and bracket 22 may be adjusted to an unlimited number of angular positions with respect to the axle housing 30 will give mechanics a wide selection of settings for the supplemental spring 2, which were unattainable in prior art devices of this nature.

The weight which is to be shouldered by spring 2 will vary considerably from one situation to another, depending on the weight of the vehicle, the load which is carried, the strength of the primary suspension springs and the type of road travelled. Also, after extended use, the spring 2 may lose some of its strength. In all of these situations, a mechanic may easily adjust the spring to accommodate the particular conditions encountered.

A simple and effective way to adjust the spring will now be described with reference to FIG. 3. The frame 26 of the vehicle is raised by means of a jack to the position indicated in broken lines 42. If the nuts 25 are loose, this will raise the rear end of the spring and cause the clamping means 19 to rotate about the axle in a clockwise direction. The relatively horizontal portion of spring 2 will then be in the position indicated by broken lines 44. Then nuts 25 are tightened so that the clamping means 19 will firmly grip the axle housing. When the frame 26 is lowered, the lower portion of spring 2 will be placed under compression and some of the vehicle's load will be sustained by the supplemental spring 2. Of course, the magnitude of the load supported by spring 2 will be dependent upon the extent to which the frame is raised during installation. If it is to carry a heavy load, the body is raised to a higher position than if the spring were to carry a light load. In either event, adjustment is most convenient.

It should be noted that the particular clamping means 19 is also important from the standpoint of adaptability to automobiles made by different manufacturers. Since most automobiles have axle housings of circular cross-section, the present supplemental spring is conveniently capable of being attached to a wide variety of vehicles without modification. This has not been true of supplemental springs of this type known heretofore.

Figure 4:
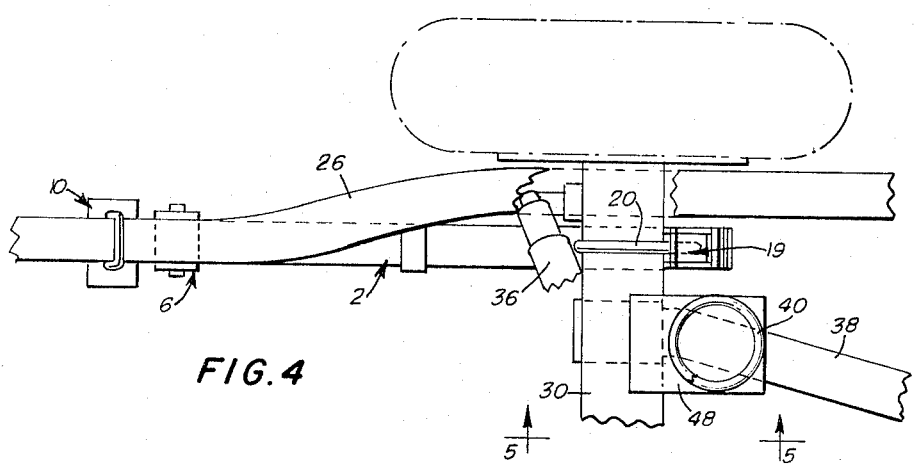
FIG. 4 is a plan view looking downwardly on the assembly illustrated in FIG. 3.

A collateral function of the spring 2 is to prevent side swaying of a vehicle as it is cornered. This will be understood in FIG. 4, where a plan view of the suspension system is shown. Side swaying occurs when the body slips laterally in directions indicated by the arrow 46. Since the forward end of spring 2 is firmly anchored to the axle assembly, and since the particular linkage used to connect its rear end to the frame 26 does not permit significant transverse movement, the spring will produce a moment in a horizontal plane to inhibit side swaying.

FIG. 5 shows additional details of one type of suspension system which may employ the supplemental spring of this invention. Here, the coil spring 40 rests on a bracket 48, cantilevered from the axle housing, and the radius rod 38 attaches to the projection 34 beneath the axle housing. There are a wide variety of alternative systems in which the coil spring 40 may be said to rest on the axle assembly; for example, when it is supported directly on the radius rod proximate to the axle housing.

From the foregoing, it will be appreciated that a new, useful and most convenient spring has been provided; and that this represents a contribution to the vehicle suspension art. It is expected that others may devise modifications to this system, this spring and this method which will not duplicate the single embodiment described herein. Therefore, the essence of the invention, encompassing the many possible modifications, not shown, is set forth in the claims which follow.

I claim:
1. A vehicle suspension assembly comprising
   (a) an axle assembly including an axle housing of circular cross section;
   (b) a vehicle body yieldably supported above said axle assembly;
   (c) a coil spring with a generally vertical axis operatively attached to and between said vehicle body and said axle assembly;
   (d) a leaf spring having one end attached to said vehicle body at a point spaced from said coil spring, and its opposite end attached to said axle housing;
   (e) adjustable clamping means rigidly attaching said opposite end of said spring to said axle housing to prevent relative angular movement between the opposite end of the spring and the axle housing, said clamping means encircling said axle housing to permit positioning of said opposite end of said spring in an infinite number of preselected positions in order to vary the portion of the vehicle load supported by said leaf spring; and
   (f) means for adjusting the tightness of said clamping means on said axle housing.

2. A vehicle suspension assembly according to claim 1 wherein said leaf spring is under compression in its lower portions under the normal weight of the vehicle.

3. A vehicle suspension system according to claim 1 having link means attaching said one end of said leaf spring to said vehicle body, said link means having its ends pivotally attached to said leaf spring and said vehicle body.

4. A vehicle suspension system according to claim 1 wherein said leaf spring is arcuate with its center of curvature located thereabove.

5. A vehicle suspension assembly according to claim 1 wherein said clamping means includes a U-bolt encircling said axle housing, said U-bolt having its parallel legs extending through said leaf spring.

6. A vehicle suspension assembly according to claim 5 having a bracket member between said leaf spring and said axle housing, said bracket having a flat surface lying against said leaf spring and a serrated arcuate surface lying against said axle housing.

7. A supplemental spring assembly for use with a vehicle having a body and an axle, said supplemental spring assembly comprising
   (a) an arcuate leaf spring having its center of curvature thereabove and its greatest curvature closer to its opposite end than to its one end;
   (b) means on said one end of said spring for attaching said spring to the vehicle body at a point spaced from the vehicle axle;
   (c) clamping means at the opposite end of said spring for rigidly attaching said opposite end to said axle housing to prevent relative angular movement of said opposite end of the leaf spring on the axle housing, said clamping means being capable of encircling the axle housing to permit positioning of said opposite end of said spring in an infinite number of preselected positions in order to vary the portion of the vehicle load supported by said leaf spring; and (d) means for adjusting the tightness of said clamping means on said axle housing.

8. A supplemental spring assembly according to claim 7 having link means for attaching said one end of said leaf spring to said vehicle body, said link means having one end pivotally attached to said leaf spring and another end mounted for pivotal attachment to said vehicle body.

9. A supplemental spring assembly according to claim 7 wherein said clamping means includes a U-bolt for encircling said axle housing, said U-bolt having its parallel legs extending through said leaf spring.

10. A supplemental spring assembly according to claim 9 having a bracket member adjacent said opposite end of said leaf spring for contacting said axle housing, said bracket having a flat surface lying against said leaf spring and a serrated arcuate surface for lying against said axle housing.

References Cited by the Examiner
UNITED STATES PATENTS

| | | | |
|---|---|---|---|
| 1,384,040 | 7/1921 | Border | 267—41 |
| 2,973,196 | 2/1961 | Scheublein et al. | 267—45 |
| 3,051,468 | 8/1962 | Lenet | 267—16 |

ARTHUR L. LA POINT, *Primary Examiner.*

R. W. WOHLFARTH, *Assistant Examiner.*